July 10, 1951  H. P. COTTINGHAM  2,560,089
COLLAPSIBLE RECEPTACLE
Filed Feb. 13, 1948  2 Sheets-Sheet 1
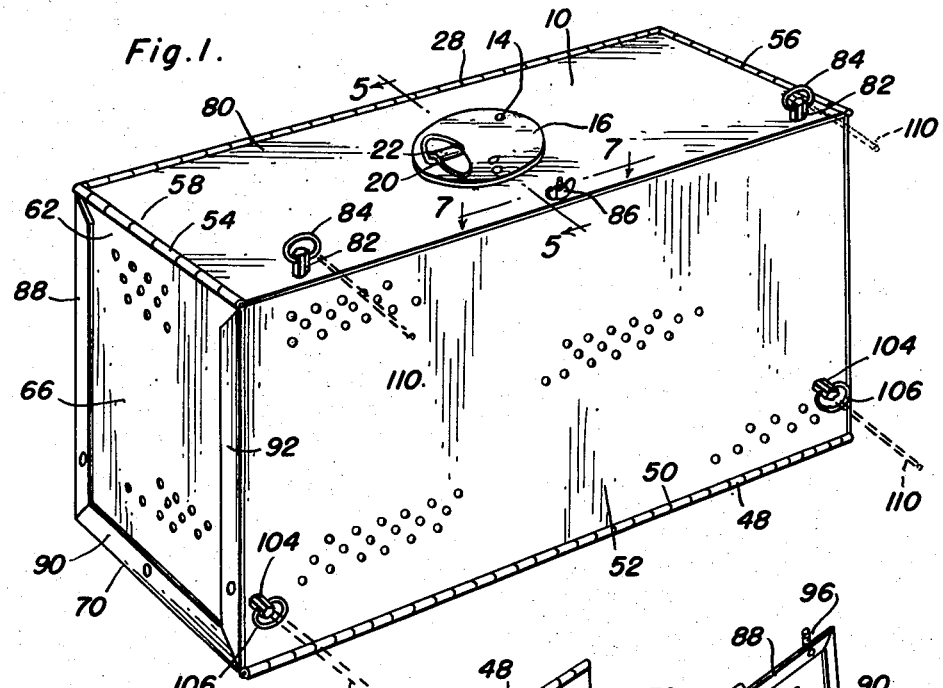
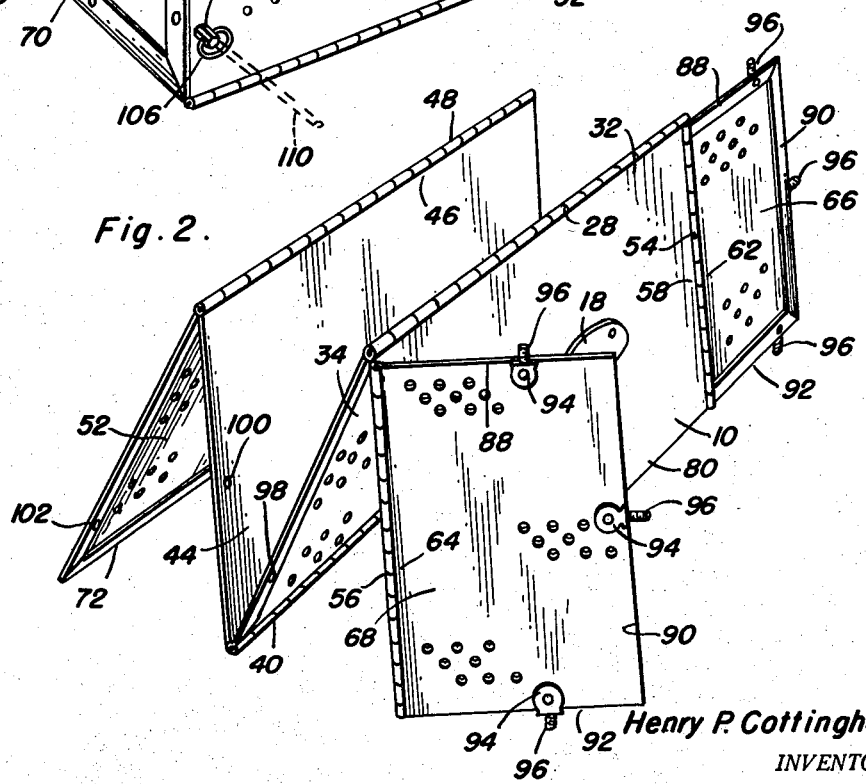
Henry P. Cottingham
INVENTOR.

July 10, 1951     H. P. COTTINGHAM     2,560,089
COLLAPSIBLE RECEPTACLE
Filed Feb. 13, 1948     2 Sheets—Sheet 2
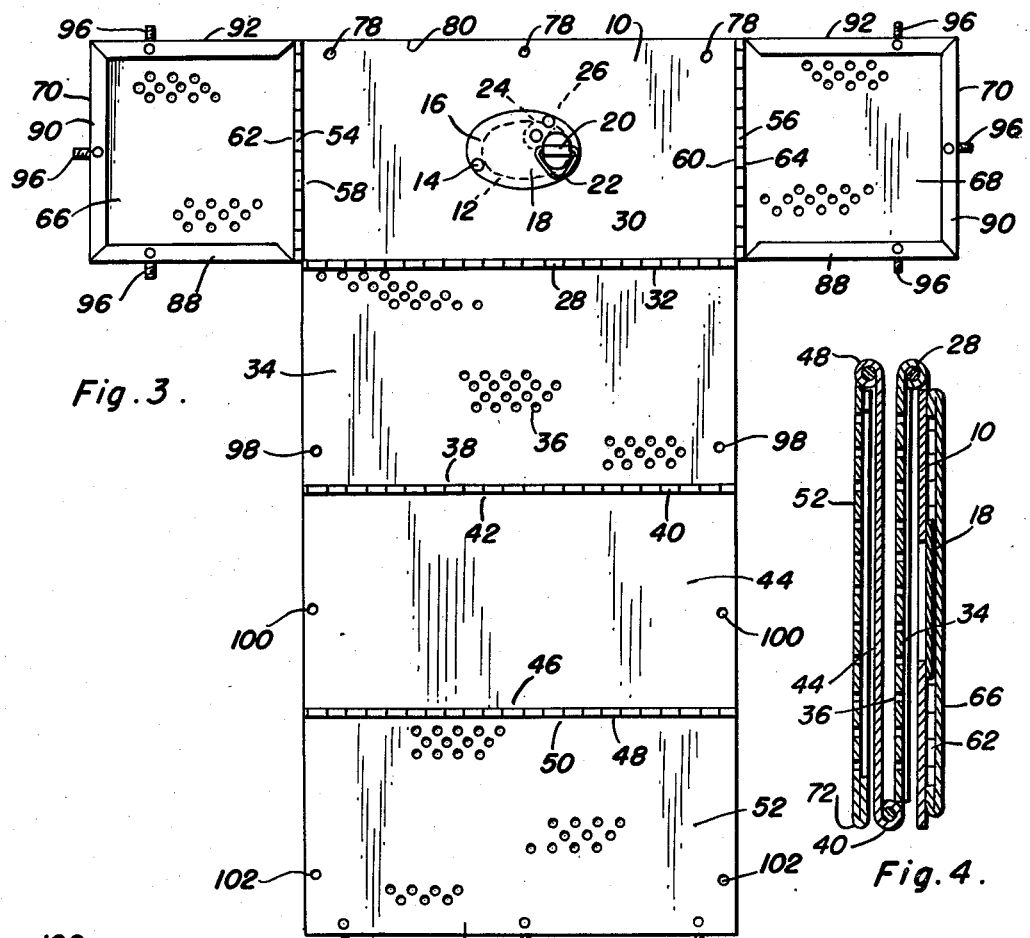
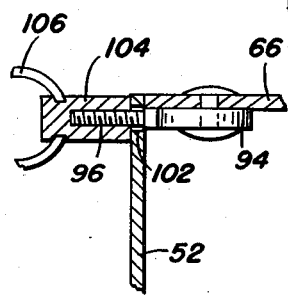
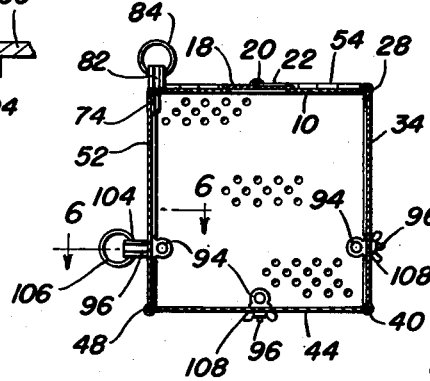
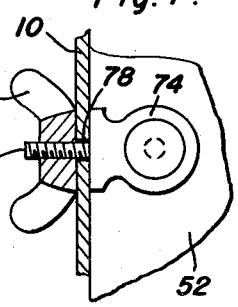
Henry P. Cottingham
INVENTOR.

Patented July 10, 1951

2,560,089

UNITED STATES PATENT OFFICE 2,560,089

COLLAPSIBLE RECEPTACLE

Henry P. Cottingham, Indianapolis, Ind.

Application February 13, 1948, Serial No. 8,080

4 Claims. (Cl. 220—7)

This invention relates to new and useful improvements in receptacles and the primary object of the present invention is to provide a novel and improved collapsible storage receptacle for live fish so designed as to facilitate fish caught by a fisherman to be inserted in the same as the said receptacle is positioned in the water and attached to a boat.

The greater number of fishermen spend from one day up to many days during a season fishing on lakes and streams mostly in boats and more often than not at places removed from their homes. The usual method of handling fish caught is to put them on a stringer or in a net attached to a boat, with the captive fish held on the string or in the net and kept alive while the string or net is kept in the water. But in moving the boat either to new fishing waters or returning to shore, fish held in such a manner will often drown and die; so the average fisherman will haul in the string or net to the bottom of the boat where the fish will soon die from lack of water. Many fishermen will not clean or eat a fish that has died. Some will; so it means that many dead fish that have been caught are discarded, while those that do not want them must immediately clean the fish caught and either eat them then or have good refrigeration to keep them, particularly in warm weather. Most fishermen want to eat some of the fish caught while they are on a trip and take a supply home, and many want to take their entire catch home. In any case, they want their fish in a fresh edible condition, and fish deteriorate rapidly after death unless properly refrigerated. It is therefore, the principal feature of this invention to provide a collapsible receptacle which will preserve and keep fish alive for a fisherman until he wants to clean them for eating or taken them home, this present receptacle being applicable for either or both of the aforementioned methods.

Another important object of the present invention is to provide a receptacle for retaining fish in a live condition that includes novel and improved assembling means which are quickly and readily manipulated to hold the receptacle in an assembled form for use, or for collapsing the receptacle to facilitate the convenient storing, shipping or carrying thereof.

A further object of the present invention is to provide a collapsible storage receptacle for live bait that is small and compact in structure and which may be conveniently attached to a boat or the like to be supported relative to the same in an accessible position to a fisherman.

A still further aim of the present invention is to provide a storage receptacle for live fish that is simple and practical in construction, strong and reliable in use, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the present invention in an assembled form;

Figure 2 is a perspective view of the present storage receptacle in a partially folded position for carrying;

Figure 3 is a plan view of the present collapsible storage receptacle for live fish in a flat unfolded position;

Figure 4 is a transverse vertical sectional view of the present invention in a completely folded position for carrying;

Figure 5 is a transverse vertical sectional view taken substantially in the plane of section line 5—5 of Figure 1;

Figure 6 is an enlarged transverse vertical sectional view taken substantially on the plane of broken section line 6—6 of Figure 5; and, Figure 7 is an enlarged longitudinal fragmentary sectional view taken substantially on the plane of section line 7—7 of Figure 1.

Referring now to the drawings in detail, wherein for the purpose of illustration, there is disclosed a preferred embodiment of the present invention, numeral 10 represents a substantially rectangular upper wall of preferably rust-proof material which is provided with a central substantially elliptical entrance opening 12. Pivoted by a rivet or the like 14 adjacent the opening 12, is one end 16 of a substantially elliptical closure plate 18, the upper face of which rigidly supports a sleeve 20 that pivotally receives a finger engaging ring 22. Fixed to the lower face of the plate 18 is one end of a resilient locking arm 24 the free end 26 of which is offset to frictionally engage the lower or inner face of the upper wall 10 to retain the closure plate 18 in a normally closed position relative to the opening 12.

Hinged as at 28 to one longitudinal edge 30 of the upper wall 10, is one longitudinal edge 32 of a substantially rectangular, preferably rust-proof side wall 34 that is provided with a plurality of perforations 36. The free longitudinal edge 38 of this side wall 34 is hinged as at 40 to one longitudinal edge 42 of a substantially rectangular bottom wall 44, the remaining longitudinal edge 46 of which is hinged as at 48 to one longitudinal edge 50 of a further substantially rectangular perforated side wall 52.

Hinged as at 54 and 56 to the transverse side edges 58 and 60 of the upper wall 10, are the inner edges 62 and 64 of a pair of perforated end walls or closures 66 and 68, the free edges of which are folded inwardly upon themselves to form rounded edges 70 which may be safely handled.

Pivotally secured adjacent the free longitudinal edge 72 of the further side wall 52, are the eye portions 74 of a plurality of longitudinally spaced threaded rods 76 that normally project outwardly from the edge 72. These rods 76 are adapted to loosely engage and extend through longitudinally spaced apertures 78 provided in the upper wall 10, adjacent the free longitudinal edge 80 thereof. A pair of these rods 76 engage nuts 82 that support pivot rings 84, and the remaining of the rods 76 receivably engage wing nuts 86 for holding the upper wall 10, side walls 34 and 52, and bottom wall 44 in an assembled position.

Pivotally secured to the end walls 66 and 68, adjacent the free edges 88, 90 and 92 thereof, are the eye portions 94 of further threaded rods 96 that normally project outwardly from the edges 88, 90 and 92 to loosely engage apertures 98, 100 and 102 formed in the respective walls 34, 44 and 52, for holding the end walls 66 and 68 fixed to the walls 34, 44 and 52. The rods 96 extend through the apertures 102 and receivably engage nuts 104 that support pivot rings 106, and the remaining rods 96 receivably engage wing nuts 108.

It should be noted that all of the walls of the present receptacle are preferably constructed of a rough rust-proof material so that when the same is disposed in a fluid medium, the walls will not become rusted to harmfully affect and contaminate fish that may be kept therein.

In practical use of the present collapsible receptacle, a light rope or cord is extended through one pivot ring 84, through one of the pivot rings 106, even through the other pivot ring 106, and hence through the remaining pivot ring 84 where the same is tied to the rope by a knot which is disposed centrally between the pivot rings 84. The free end of the rope is used to secure the present box by tying to a choice of places available on the inside of most boats, so that the receptacle is secure in a half or two-thirds submerged position to a side or back of the boat. The side would be used in case an outboard motor was attached to the back of the boat, while the back could be used with a fisherman manually rowing a boat. It is possible to apply the present receptacle to a boat by the use of clamping means.

When a fisherman catches a fish, he merely needs to disengage the fish hook and drop the fish in the receptacle which will have sufficient fresh water in a one-half or two-thirds submerged position to keep the fish alive and fresh, during any movement of the boat. When the fisherman finishes for the day, he can submerge and tie the receptacle at a boat dock or shore line and keep his fish alive indefinitely or until he wants to use them.

Another use of the receptacle is to submerge the same and to tie the rope carried by the pivotal rings to a dock or shore line. In this position, fish brought in from a short trip in which the fisherman has made several catches may be conveniently inserted into the same to be retained in a fresh condition until used.

To disassemble the receptacle in its normally fixed position as illustrated in Figure 1, it is merely necessary to remove the nuts 104, 82 and 86 so that the end walls 66 and 68 may be folded inwardly against the outer face of the upper wall 10, the outer face of the side wall 34 against the inner face of the upper wall 10, the inner face of the bottom wall 44 against the inner face of the side wall 34, and the outer face of the side wall 52 against the outer face of the bottom wall 44, whereby the device may be conveniently handled for carrying.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention what is claimed as new is:

1. A collapsible storage receptacle comprising a substantially rectangular upper wall having an opening therein, closure means carried by the upper wall for closing the opening, means for normally holding the closure in a closed position, a substantially rectangular side wall hinged at one longitudinal edge to one longitudinal edge of said upper wall, a substantially rectangular lower wall having one longitudinal edge hinged to the remaining longitudinal edge of the side wall, a further substantially rectangular side wall hinged at one longitudinal edge to the remaining longitudinal edge of the lower wall, a fastener pivoted to the free longitudinal edge of the further side wall for securing the same relative to the free longitudinal edge of the upper wall, a pair of end walls hinged to the transverse edges of the upper wall of the receptacle, and further fasteners pivoted to the end walls for attaching the end walls in position to the walls of the receptacle, said lower wall and said side walls having openings receiving said fasteners, and nuts receivably engaging all of said fasteners.

2. A collapsible fishing container comprising a substantially rectangular upper wall, a pair of end walls hinged to the transverse edges of said upper wall, a substantially rectangular rear wall hinged at one longitudinal edge to one longitudinal edge of said upper wall, a substantially rectangular bottom wall hinged at one longitudinal edge to the free longitudinal edge of said rear wall, a substantially rectangular front wall hinged at one longitudinal edge to the free longitudinal edge of said bottom wall, a plurality of bolts pivoted to said front wall and having ends projecting laterally from the free longitudinal edge of said front wall, said top wall having openings adjacent the free longitudinal edge thereof receiving the ends of said bolts, further bolts pivoted to said end walls and having ends projecting laterally from the free edges of said end walls, said rear wall, said bottom wall and said front wall having double thicknesses at their transverse edges said double thicknesses having openings receiving the ends of said further bolts, and nuts receivably engaging all of said bolts.

3. A collapsible storage receptacle comprising a substantially rectangular upper wall having an opening therein, closure means carried by the upper wall for closing the opening, means for normally holding the closure in a closed position, a substantially rectangular side wall hinged at one longitudinal edge to one longitudinal edge of said upper wall, a substantially rectangular lower wall having one longitudinal edge hinged to the remaining longitudinal edge of the side wall, a further substantially rectangular side wall hinged at one longitudinal edge to the remaining longitudinal edge of the lower wall, means pivotally carried by the free longitudinal edge of the further side wall for securing the same relative to the free longitudinal edge of the upper wall, a pair of substantially square end walls hinged at one end of their edges opposite the transverse edges of the upper wall, and means pivotally carried by said end walls for securing the free edges of the end walls to the transverse edges of the lower wall and side walls, said last-mentioned means including a plurality of spaced fasteners carried by said end walls and having threaded ends projecting outwardly from the edges of said end walls, said lower wall and said side walls including thickened transverse edges having openings receiving the threaded ends of said fasteners, and nuts receivably engaging the threaded ends of said fasteners and bearing against said lower wall and said side walls.

4. The combination of claim 3 and line-receiving rings carried by certain of said nuts.

HENRY P. COTTINGHAM.

REFERENCES CITED

The following references are of record in the file of this patent:

UNITED STATES PATENTS

| Number | Name | Date |
|---|---|---|
| 86,159 | Hudson | Jan. 26, 1869 |
| 524,259 | Matthews | Aug. 7, 1894 |
| 1,005,876 | Reeser | Oct. 17, 1911 |
| 1,091,391 | Romans | Mar. 24, 1914 |
| 1,132,000 | Dight | Mar. 16, 1915 |
| 1,191,067 | De Laye | July 11, 1916 |
| 1,402,666 | Sexton | Jan. 3, 1922 |
| 1,509,710 | Chambers | Sept. 23, 1924 |
| 2,216,277 | Massey | Oct. 1, 1940 |
| 2,231,619 | Fenton | Feb. 11, 1941 |